United States Patent [19]
Hasquenoph et al.

[11] 3,854,681
[45] Dec. 17, 1974

[54] DEVICE FOR STEADYING LOADS SUSPENDED FROM AIRCRAFTS

[75] Inventors: Jean Henri Hasquenoph, Lagny; Pierre Fernand Coutin, Paris, both of France

[73] Assignee: R. Alkan & Cie, Valenton, France

[22] Filed: Mar. 7, 1974

[21] Appl. No.: 449,015

Related U.S. Application Data

[62] Division of Ser. No. 366,054, June 1, 1973.

[52] U.S. Cl. ......... 244/118 R, 89/1.5 G, 244/137 R
[51] Int. Cl. ............................................. B64d 1/02
[58] Field of Search ..................... 244/118 R, 137 R; 294/83 AE, 83 AB, 83 RA, 102 R; 89/1.5, 89/1.606; 248/119 R; 24/230 AT, 230 AV

[56] References Cited
UNITED STATES PATENTS

3,268,188  8/1966  La Roe et al. ................. 244/137 R
3,784,132  1/1974  Newell ........................... 244/137 R

*Primary Examiner*—Trygve M. Blix
*Assistant Examiner*—Galen L. Barefoot
*Attorney, Agent, or Firm*—Ulle C. Linton

[57] ABSTRACT

This device for steadying, notably against lateral oscillation, a load releasably suspended from an aircraft comprises a pair of fork-shaped hooks rigid with the aircraft and co-acting with bridge pieces rigid with the load and having a flat top face; and a pair of wedge members associated with each hook; each wedge member consists of a cam member pivoted to a telescopic spring-urged rod and is adapted to be forced by the spring associated with the corresponding telescopic rod to engage the top face of the bridge piece and to ensure the wedging of the load.

7 Claims, 7 Drawing Figures

DEVICE FOR STEADYING LOADS SUSPENDED FROM AIRCRAFTS

This application is a division of Ser. No. 366,054, filed June 1, 1973.

BACKGROUND OF THE INVENTION

1. Field of the Invention

The present invention relates to means for steadying loads suspended from aircrafts.

2. Brief Description of the Prior Art

It is known that loads suspended from aircrafts comprise as a rule tapped cavities engaged by correspondingly screw-threaded shanks formed integrally with suspension rings. The hooks carried by the supporting or jettisoning device engage these rings for actually carrying the load. Since these rings are aligned longitudinally, the loads tend to oscillate laterally under the influence of lateral accelerations or other aerodynamic effects so that it is customary to steady these loads, when supported by the aircraft, by means of transverse bearing elements.

An arrangement generally employed to this end consists in utilizing four steadying or wedging screws engaging tapped orifices formed in four fixed bearing arms and clamping the load laterally.

This arrangement, although very efficient, has various drawbacks: in fact, the bearing arms are relatively heavy and the assembly including the four wedging or steadying screws is objectionable on accouunt of its poor aerodynamic contour. On the other hand, the steadying operation proper requires the tightening of four screws.

SUMMARY OF THE INVENTION

It is the essentiel object of the present invention to provide an improved device for steadying loads suspended from aircrafts which eliminates the inconveniences of prior art systems, while reducing or even eliminating the span of the bearing arms and ensuring in certain cases the automatic steadying of the load without requiring any particular manoeuvre, except the closing of the load suspension hooks.

The device according to the invention, which is adapted to be associated with a load suspended from a pair of fork-shaped hooks rigid with the carrier member of the aircraft and co-acting which bridge pieces rigid with the load and having a flat top face, comprises a pair of wedge members associated with each hook on the opposite sides thereof, each wedge member consisting of a cam pivoted to a spring urged rod, this cam being forced by the spring of the corresponding rod to engage the flat top face of the bridge piece and to ensure the wedging of the load. The device operates automatically in that the only manoeuvre necessary for suspending a fresh load is the usual hook closing movement.

Obviously, means could also be provided for actuating the wedges, for example in the form of screws, in case such automatic operation were not deemed necessary.

A few typical forms of embodiment of the present invention will now be described in detail with reference to the attached drawings, in which:

DESCRIPTION OF THE PREFERRED EMBODIMENT

Figure 1:
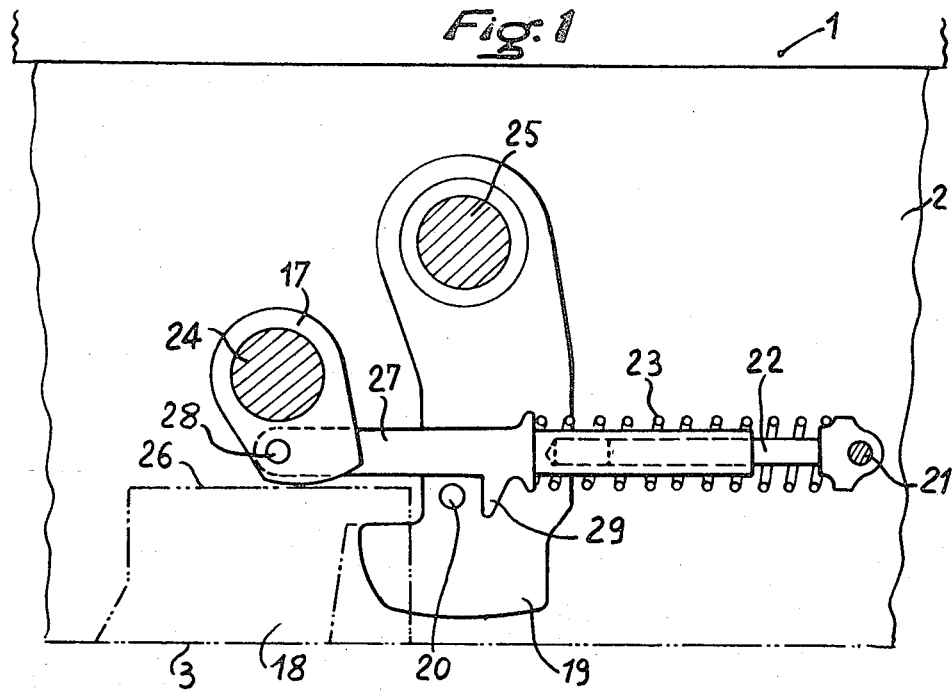
FIGS. 1 and 2 illustrate diagrammatically in vertical and horizontal section, respectively, a wedging device utilizing cam members pivoting about axes parallel to these of the load suspension hooks and adapted to be retracted automatically when opening the suspension hooks.
Figure 3:
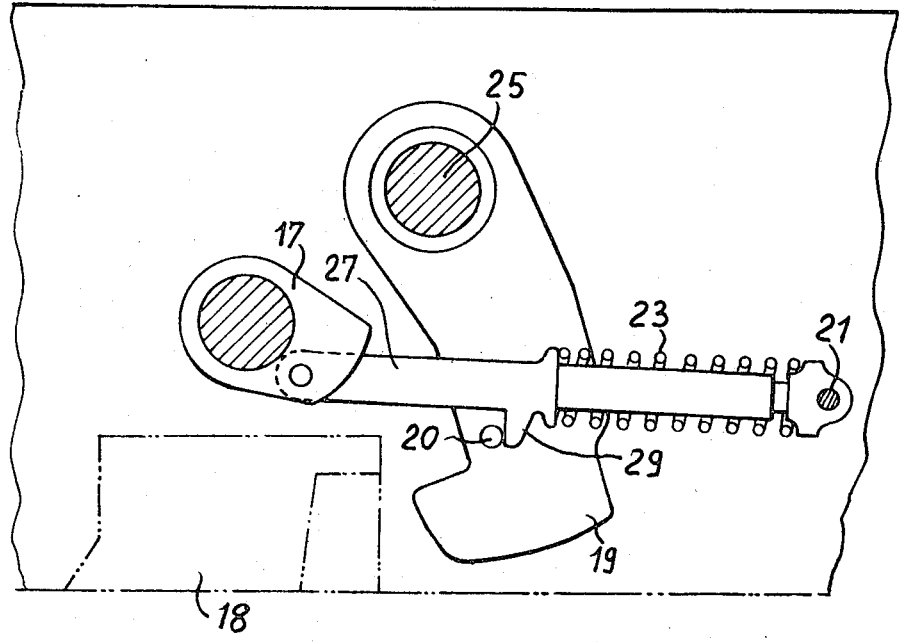
FIG. 3 is a view similar to FIG. 1 but showing the suspension hook in an open position.
Figure 2:
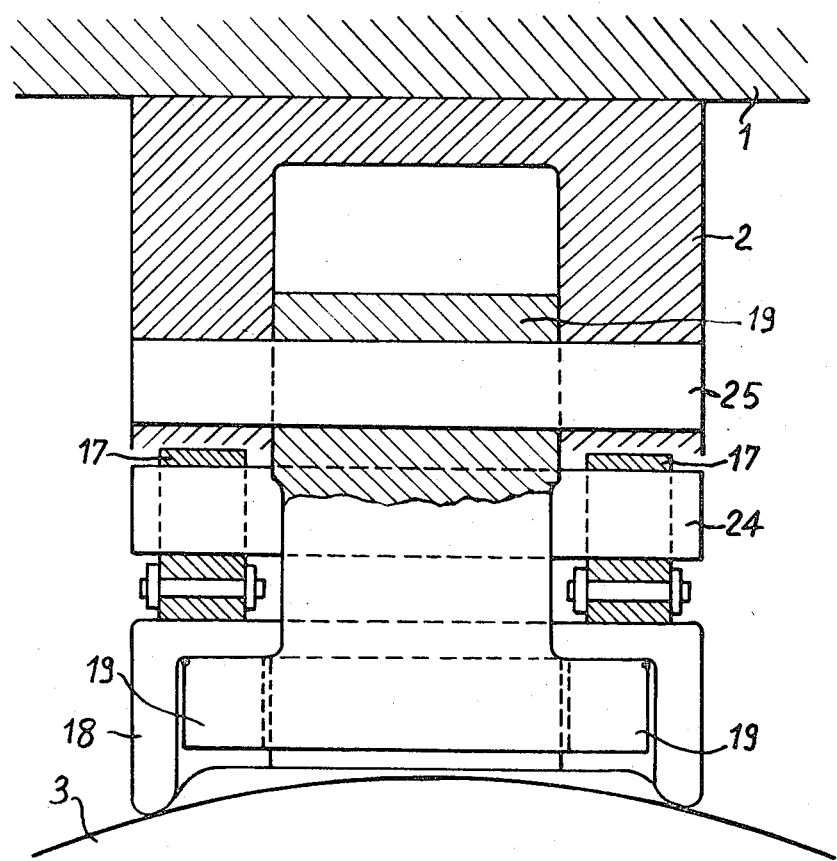

FIG. 1 is a side elevational view showing a suspension hook in its closed condition, 1 being the aircraft structure, 2 the vertical support interposed between the aircraft structure and the load, and 3 the load proper of which only the upper generatrix is shown. Furthermore, 18 is a bridge piece secured to the load and substituted for one of the conventional load rings, and 19 is a fork-shaped hook engageable under said bridge piece 18. This bridge piece 18 comprises a plane surface 26 against which cams 17 pivoted to a shaft 24 carried by the support 2 are caused to bear. A cam 17 is disposed above each prong of the fork-shaped hook 19, as clearly shown in the transverse view of FIG. 2. Each cam is urged to its wedging position by the force of a coil compression spring 23 via a push-rod 27 pivotally connected to the cam by means of a pivot pin 28. The push-rod 27 and its spring 23 are guided by means of a slide member 22 pivoted in turn to the pivot pin 21 rigid with said support 2. It is clear that the arrangement will include two hooks 19 spaced from each other in the longitudinal direction and that two cams 17 are associated with each hook.

Figure 5:
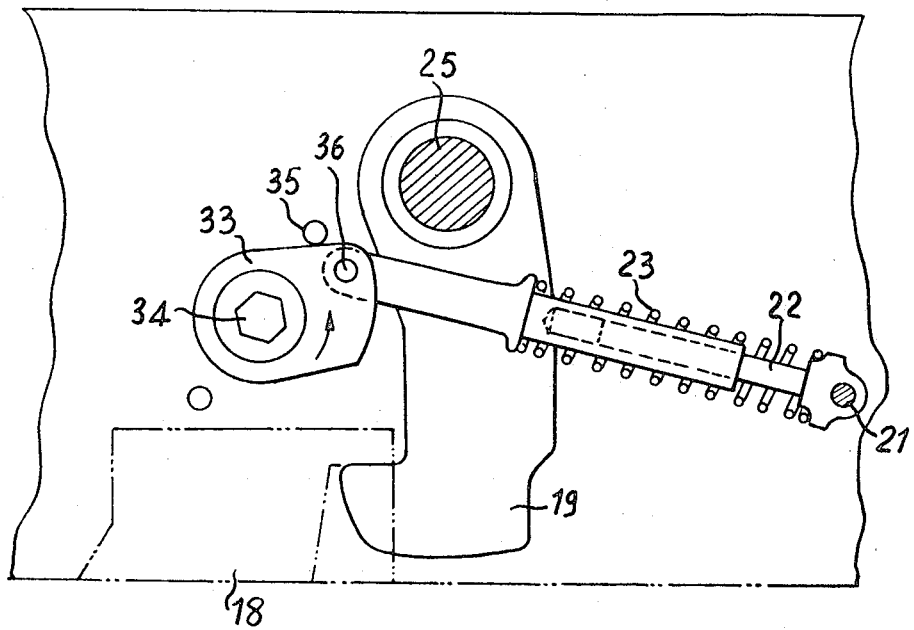
FIGS. 5, 6 and 7 illustrate devices similar to the one illustrated in FIGS. 1 to 3, but with means for controlling the withdrawal of the wedging or steadying means independently of the hook actuating means.

Should a sufficient transverse force acting on said load cause play to develop in the suspension system, the corresponding cam 17 urged by its spring 23 will rotate to take up this play. The progressive contour of the cam is such that retracting the plane 26 on said cam 17 cannot cause its rotation in the opposite direction. On the other hand, when opening the hooks 19 the pins 20 projecting from these hooks 19 engage heels or like projections formed on push-rods 27 and thus, during their movement, carry along the cams 17 to their retracted position as shown in FIG. 5. When the hooks are retained in their open position by suitable and conventional means (not shown) the cams remain retracted to permit the engagement of a fresh load. Reclosing the hooks 19 will release the push-rods 27 and thus free the cams which resume their operative steadying or locking position as shown in FIG. 1.

Figure 4:
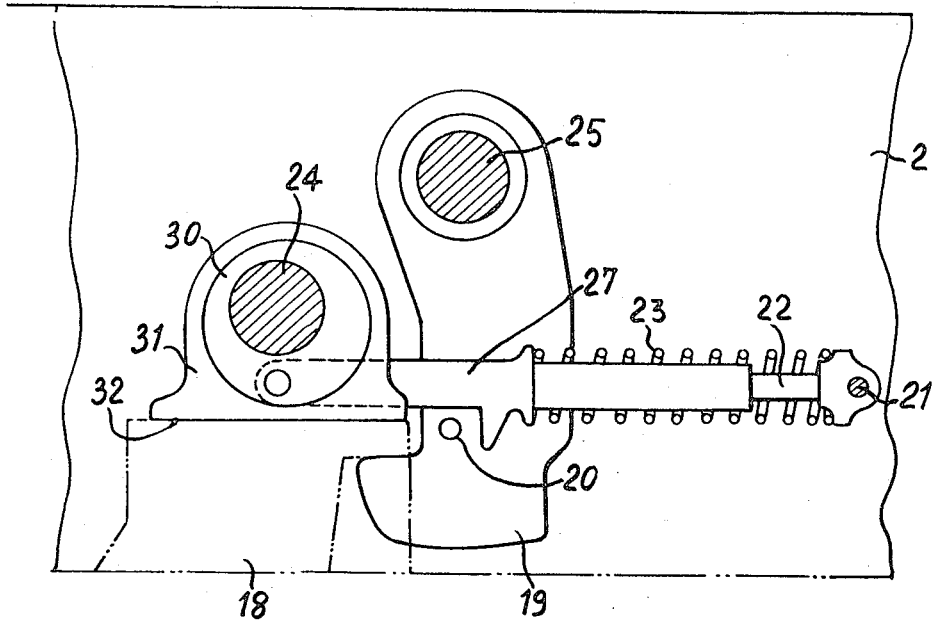
FIG. 4 illustrates a modified form of embodiment of the steadying device of FIGS. 1 to 3, wherein contact faces are substituted for the contact lines in the wedge members proper.

If, notwithstanding the use of very hard steel grades, very high stresses caused impressions to develop in the cams 17 and/or bridge piece 18, relatively large eccentrics associated with, or journalled in, shoes may be substituted for said cams, in order to substitute a surface contact for the line contact. In this case the shaft 24 carried by the support 2 has journalled thereon an eccentric 30 urged for clockwise rotation as shown in FIG. 4, i.e., as in the cam system described hereinabove. This eccentric 30 is journalled in a shoe member 31 formed at its bottom with a flat sole 32; thus, relatively large contact areas are obtained, i.e., cylindrical surfaces between the load and bridge piece 18, and plane surfaces between this bridge piece 18 and the shoe 31.

Figure 6:
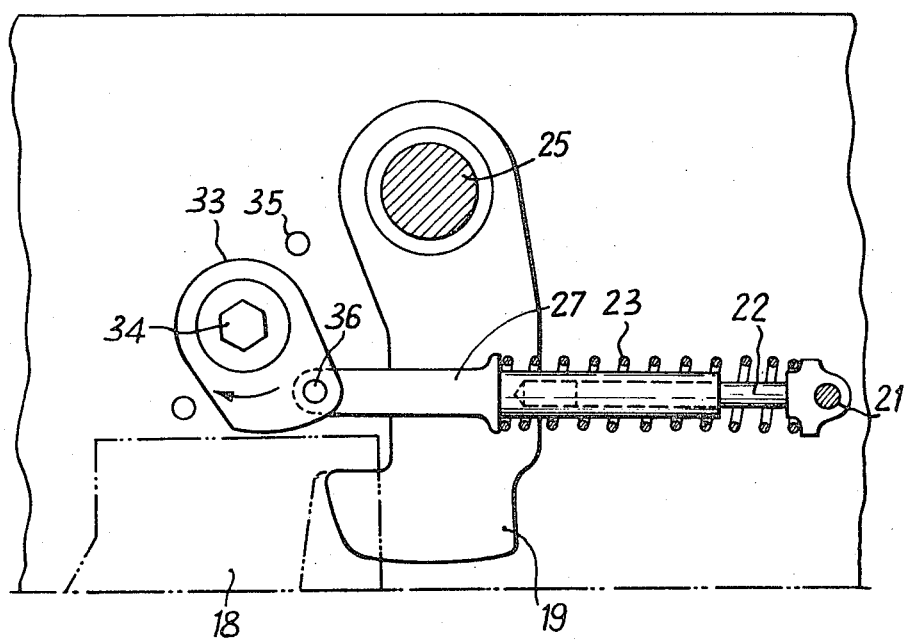

In certain cases it may be necessary to provide a relatively ample clearance for the hook, for example to facilitate a difficult suspension step, so that an operative connection between this hook and the wedging device may prove unnecessary. In this case, one of the modified arrangements suitable for the purpose may be the one shown by way of example in FIGS. 5 and 6. In this arrangement, the hook 19 having the shape of a two-armed fork is adapted to be rotated about the shaft 25 independently of cam 33. Similarly, this cam 33 comprising means for rotating same, for example, in the form of a hexagonal-sectioned stub shaft 34, is adapted to be brought manually either to the raised position shown in FIG. 5 or to the wedging position shown in FIG. 6. The raised position is stabilized by a coil compression spring 23 reacting against the fixed pin 21 and tending to develop the telescopic guide system 22, 23 pivoted at 36 to the cam 33. In this raised position the line of action of this telescopic system as defined by the alignment of points 21 and 36 is directed above the axis of rotation of said cam and therefore this cam is urged for rotation in the direction of the arrow towards a stop 35. This raised position permits on the one hand the closing of the hooks with all the desired clearance, and on the other hand the introduction of the load under the bridge piece 18. Once the load 3 has thus been suspended the operator rotates manually the hexagonal stud shaft 34 and the cam 33 is restored to its wedging position against the force of spring 23, as shown in FIG. 6, but owing to the particular arrangement of the component elements when the line of action of the telescopic system 22, 23 clears the axis of rotation of cam 33, the spring 23 urges this cam by knee action in the wedging direction shown by the arrow in FIG. 6. Then the play take up is obtained automatically as already explained in the foregoing and as also mentioned hereinabove the hook 19 is a two-armed fork, each fork prong corresponding to one cam.

Figure 7:
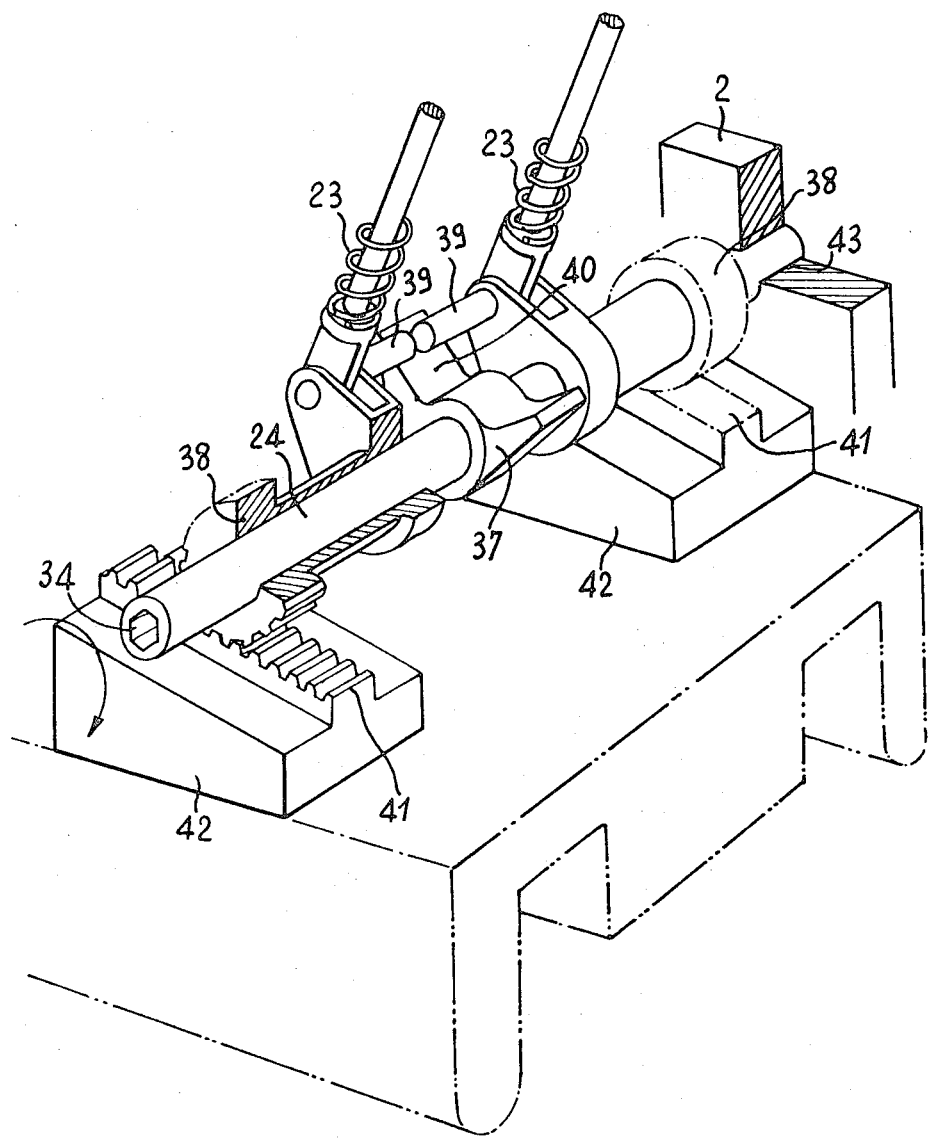

It will be readily understood that each cam can be operated separately, or alternatively rotating the hexagonal shaft may cause the twin cams to be rotated simultaneously. A systematic play provided in the drive of one cam by the other cam may leave a sufficient wedging possibility for each cam. FIG. 7 illustrates a typical example of a system for controlling the two wedging members simultaneously by providing the systematic play mentionned hereinabove. The shaft 24 comprises at either end a hexagonal portion 34 and is journalled in bearings such as 43 rigid with the support 2. Secured to this shaft is a V-shaped member 37. Driving members 38 adapted to rotate about the shaft 24 are shown as comprising pinions in the Figure but it is obvious that cam members could be substituted therefor as well, for example, as shown in FIGS. 5 and 6. These driving members 38 are urged for rotation by springs 23 as in the arrangement of FIGS. 5 and 6, and each member 38 carries a finger parallel to shaft 24 and disposed between the arms of the V-shaped member 37.

Thus, when rotating the shaft 24 by means of one of the control hexagonal ends 34 in the direction of the arrow (FIG. 7), the arm 40 of V-shaped member 37 engages the fingers 39 and rotates the driving members 38 until the line of action of spring 23 clears the axis of shaft 24, as already explained hereinabove with reference to the preceding form of embodiment. Nothing prevents each spring 23 from freely moving the corresponding member 38 to its endmost position. During the reverse manoeuvre the fingers 39 are driven by the other arm of the V-shaped member. The angle of divergence of these two arms of the V-shaped member 37 permits the free movement of each member. As already pointed out in the foregoing, the driving members 38 are shown in the form of pinions, and these are in meshing engagement with racks 41 rigid with wedging member 42 guided by suitable means (not shown) in said support 2.

What we claim is:

1. Device for steadying loads suspended from aircrafts, comprising a pair of fork-shaped hooks rigid with a carrier member of the aircraft and coacting with bridge pieces rigid with the load and having a flat top face, and a pair of wedge members associated with each fork-shaped hook on the opposite sides thereof, each wedge member consisting of a cam member pivoted to a telescopic spring-urged rod and said cam member being forced by the spring associated with the corresponding telescopic rod to engage the top face of the bridge piece and to ensure the wedging of the load.

2. Device for steadying loads suspended from aircrafts, comprising a pair of fork-shaped hooks rigid with a carrier member of the aircraft and co-acting with bridge pieces rigid with the load and having a flat top face, and a pair of wedge members associated with each fork-shaped hook on the opposite sides thereof, the wedge members consisting of shoes responsive to eccentric members journalled to said carrier member and these shoes comprising a bearing surface adapted to engage according to a surface contact the top face of the bridge piece of the load, the eccentric members being pivoted to telescopic spring-urged rods.

3. Device according to claim 1, wherein each fork-shaped hook comprises lateral projecting pins engaging, during the opening movement of said hook, the telescopic rod associated with this hook to force said rod against the action of its associated spring and to move automatically the wedge member to its retracted position.

4. Device according to claim 1, wherein the telescopic spring-urged rod imposes stable wedging and release positions to the cam member co-acting therewith on either side of a dead center angular position of said rod.

5. Device according to claim 4, wherein each cam member is adapted to be moved manually to its release position by rotating a shaft formed with a hexagonal-sectioned end portion and rigid with said cam.

6. Device according to claim 2, wherein the two wedge members associated with each fork-shaped hook are actuated independently of each other under the control force of spring means through the medium of members revolving freely on a common transverse shaft adapted, when rotated, to restore simultaneously through stop members the two wedge members to their release position.

7. Device according to claim 6, wherein said members revolving freely on a common transverse shaft consist of pinions in meshing engagement with racks of the upper face of the wedge members.

* * * * *